United States Patent
Muldoon

(10) Patent No.: US 12,338,770 B1
(45) Date of Patent: Jun. 24, 2025

(54) THRUST DIVERTER FOR AN OPEN ROTOR AIRCRAFT PROPULSION SYSTEM

(71) Applicant: Raytheon Technologies Corporation, Farmington, CT (US)

(72) Inventor: Marc J. Muldoon, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/106,272

(22) Filed: Feb. 6, 2023

Related U.S. Application Data

(60) Provisional application No. 63/306,716, filed on Feb. 4, 2022.

(51) Int. Cl.
| | |
|---|---|
| *F02C 6/20* | (2006.01) |
| *F02C 9/18* | (2006.01) |
| *F02K 1/68* | (2006.01) |
| *F02K 1/70* | (2006.01) |

(52) U.S. Cl.
CPC ............... *F02C 6/206* (2013.01); *F02C 9/18* (2013.01); *F02K 1/68* (2013.01); *F02K 1/70* (2013.01)

(58) Field of Classification Search
CPC .... F02C 6/206; F02C 9/18; F02K 1/68; F02K 1/70; F05D 2220/325
See application file for complete search history.

(56) References Cited

U.S. PATENT DOCUMENTS

| | | | | |
|---|---|---|---|---|
| 4,446,696 | A * | 5/1984 | Sargisson | F02K 3/077 60/226.3 |
| 4,765,135 | A | 8/1988 | Lardellier | |
| 6,082,670 | A * | 7/2000 | Chapman | B64B 1/26 244/55 |
| 10,724,475 | B2 * | 7/2020 | Chuck | F02K 1/763 |
| 2016/0160757 | A1 * | 6/2016 | Todorovic | F02C 7/04 415/115 |
| 2017/0122257 | A1 * | 5/2017 | Sankrithi | F02K 3/072 |
| 2017/0198658 | A1 * | 7/2017 | Higgins | F02K 1/60 |
| 2017/0321632 | A1 * | 11/2017 | Howarth | F02K 1/70 |
| 2018/0370647 | A1 * | 12/2018 | Iglewski | F02C 6/206 |
| 2019/0002118 | A1 * | 1/2019 | Nestico | F02K 1/763 |
| 2020/0370510 | A1 * | 11/2020 | Bregani | F01D 1/30 |
| 2021/0108595 | A1 | 4/2021 | Arif | |
| 2022/0154651 | A1 * | 5/2022 | Bowden | B64D 27/10 |
| 2022/0252008 | A1 * | 8/2022 | Sibbach | F02C 6/00 |

* cited by examiner

*Primary Examiner* — Ehud Gartenberg
*Assistant Examiner* — Henry Ng
(74) *Attorney, Agent, or Firm* — Getz Balich LLC

(57) ABSTRACT

A propulsion system is provided for an aircraft. This aircraft propulsion system includes an engine housing, an open propulsor rotor, an engine core and a thrust diversion system. The open propulsor rotor is outside of the engine housing. The engine core is within the engine housing and motively coupled to the open propulsor rotor. The thrust diversion system is configured with the engine housing. The thrust diversion system includes a door configured to move radially from a stowed position to a deployed position.

14 Claims, 8 Drawing Sheets

THRUST DIVERTER FOR AN OPEN ROTOR AIRCRAFT PROPULSION SYSTEM

This application claims priority to U.S. Patent Appln. No. 63/306,716 dated Feb. 4, 2022, which is hereby incorporated herein by reference in its entirety.

BACKGROUND OF THE DISCLOSURE

1. Technical Field

This disclosure relates generally to an aircraft propulsion system and, more particularly, to thrust diversion.

2. Background Information

An open rotor aircraft propulsion system with a tractor configuration includes an open propulsor rotor proximate a forward, upstream end of the propulsion system. The open propulsor rotor propels air into a core of the propulsion system as well as around and outside of the propulsion system. To provide reverse thrust, pitch of blades of the open propulsor rotor may be reversed. Such a reversal in thrust, however, may significantly decrease an air intake capability of the engine core, for example, where an inlet to the engine core is located just aft of the open propulsor rotor. The reverse pitch open propulsor rotor, for example, may draw air away from the engine core inlet. There is a need in the art therefore for an open rotor aircraft propulsion system capable of thrust diversion while maintaining airflow into an engine core.

SUMMARY OF THE DISCLOSURE

According to an aspect of the present disclosure, a propulsion system is provided for an aircraft. This aircraft propulsion system includes an engine housing, an open propulsor rotor, an engine core and a thrust diversion system. The open propulsor rotor is outside of the engine housing. The engine core is within the engine housing and motively coupled to the open propulsor rotor. The thrust diversion system is configured with the engine housing. The thrust diversion system includes a door configured to move radially from a stowed position to a deployed position.

According to another aspect of the present disclosure, another propulsion system is provided for an aircraft. This aircraft propulsion system includes an engine housing, an unducted rotor and a thrust diversion system. The unducted rotor is outside of the engine housing. The thrust diversion system is configured with the engine housing downstream of the unducted rotor. The thrust diversion system is configured to redirect a gas flow radially outward from the propulsion system during operation of the thrust diversion system.

According to still another aspect of the present disclosure, a method is provided during which an open rotor aircraft propulsion system is provided. This open rotor aircraft propulsion system includes an open propulsor rotor and a thrust diversion system downstream of the open propulsor rotor. The thrust diversion system is deployed to redirect a gas flow radially outward from the open rotor aircraft propulsion system.

The deploying of the thrust diversion system may include moving a door radially outward from a stowed position to a deployed position.

The thrust diversion system may include a door configured to pivot radially outward from a stowed position to a deployed position during the operation of the thrust diversion system.

The door may be disposed at an exterior of the engine housing. The door may be configured to move radially outward from the stowed position to the deployed position.

The door may be configured to pivot radially outward from the stowed position to the deployed position.

The door may lay against a structure of the engine housing when the door is in the stowed position.

The door may be seated in a recess of the engine housing when the door is in the stowed position.

An exterior surface of the door may be angularly offset from an exterior surface of the engine housing by an angle when the door is in the deployed position.

The exterior surface of the door may be parallel with the exterior surface of the engine housing when the door is in the stowed position.

A downstream end of the door may move radially outward when the door moves from the stowed position to the deployed position.

A downstream end of the door may be radially outboard of an upstream end of the door when the door is in the deployed position.

An upstream end of the door may move radially outward when the door moves from the stowed position to the deployed position.

An upstream end of the door may be radially outboard of a downstream end of the door when the door is in the deployed position.

The door may be one of a plurality of doors arranged in an array at an exterior of the engine housing. The array may extend circumferentially about a centerline of the propulsion system.

The thrust diversion system may be configured to redirect a gas flow from an interior of the propulsion system to an exterior of the propulsion system.

The door may be configured to move into an internal flowpath of the propulsion system during operation of the thrust diversion system.

The door may be configured to pivot radially into the internal flowpath from the stowed position to the deployed position.

The aircraft propulsion system may also include an open guide vane array arranged with the open propulsor rotor upstream of the thrust diversion system. The open guide vane array may include a plurality of guide vanes arranged circumferentially about engine housing.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
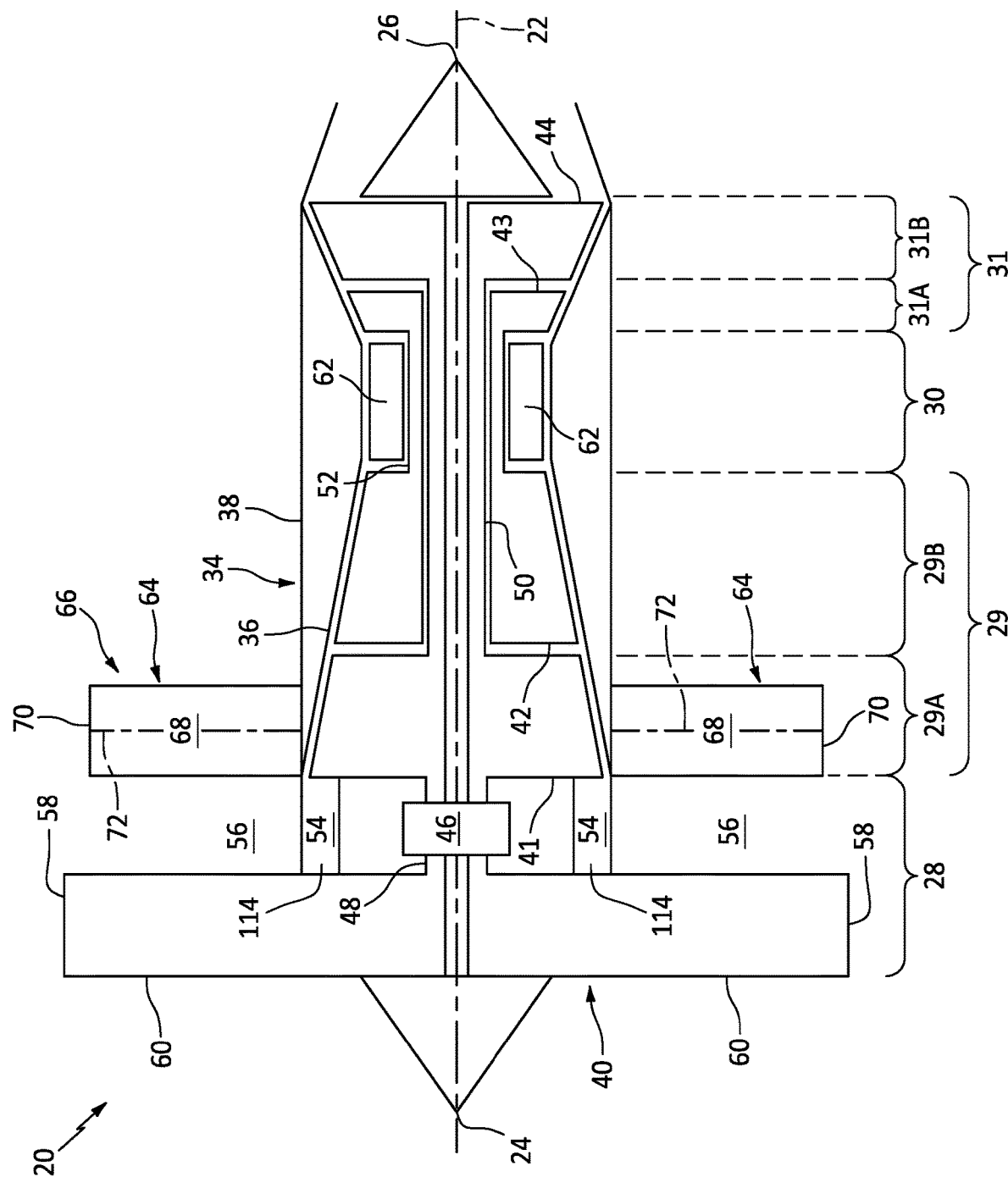
FIG. 1 is a side schematic illustration of an open rotor aircraft propulsion system with a tractor configuration.

FIG. 1 is a side schematic illustration of an open rotor aircraft propulsion system 20 for an aircraft such as, but not limited to, an airplane. This aircraft propulsion system 20 extends axially along an axial centerline 22 between a forward, upstream end 24 of the aircraft propulsion system 20 and an aft, downstream end 26 of the aircraft propulsion system 20, which axial centerline 22 may also be a rotational axis of the aircraft propulsion system 20. The aircraft propulsion system 20 includes a propulsor (e.g., an unducted fan) section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B are arranged sequentially along the axial centerline 22 between the upstream end 24 and the downstream end 26. The propulsor section 28 is configured outside of an engine housing 34 of the aircraft propulsion system 20 at an exterior of the aircraft propulsion system 20 and its engine housing 34. The engine sections 29A-31B are arranged within the engine housing 34. The engine housing 34 of FIG. 1, for example, includes a case 36 and a nacelle 38. The case 36 houses one or more of the engine sections 29A-31B; e.g., an engine core. The nacelle 38 houses and provides an aerodynamic cover for the case 36.

Each of the engine sections 28, 29A, 29B, 31A and 31B includes a respective bladed rotor 40-44. Each of these bladed rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The open (e.g., unducted) propulsor rotor 40 of FIG. 1 is connected to a gear train 46, for example, through a propulsor shaft 48. The gear train 46 and the LPC rotor 41 are connected to and driven by the LPT rotor 44 through a low speed shaft 50. The open propulsor rotor 40 may thereby be motively coupled to the engine core. The HPC rotor 42 is connected to and driven by the HPT rotor 43 through a high speed shaft 52.

During operation, the open propulsor rotor 40 directs (e.g., propels) an inner stream of air into a core flowpath 54 (e.g., an internal flowpath) within the aircraft propulsion system 20 and its engine core. This core flowpath 54 extends sequentially through the engine sections 29A-31B. The air within the core flowpath 54 may be referred to as core air. The open propulsor rotor 40 also directs (e.g., propels) an outer stream of air into a bypass flowpath 56 (e.g., an external flowpath). This bypass flowpath 56 is in fluid communication with the propulsor section 28 and bypasses the engine core. The bypass flowpath 56 of FIG. 1, more particularly, is an open flowpath at the exterior of the aircraft propulsion system 20. The engine housing 34 and its nacelle 38, for example, may at least partially or completely form an inner peripheral boundary of the bypass flowpath 56 downstream of the open propulsor rotor 40 and along the engine core. An outer peripheral boundary of the bypass flowpath 56 may be defined by a (e.g., imaginary) reference line that extends substantially axially along the axial centerline 22 aft from an outer periphery of the open propulsor rotor 40; e.g., aft from tips 58 of open rotor propulsor blades 60. The air within the bypass flowpath 56 may be referred to as bypass air.

The core air is compressed by the LPC rotor 41 and the HPC rotor 42 and directed into a combustion chamber 62 of a combustor in the combustor section 30. Fuel is injected into the combustion chamber 62 and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the open propulsor rotor 40, which propels the bypass air outside of and axially along the engine housing 34 via the bypass flowpath 56. The bypass air may account for a majority of thrust generated by the aircraft propulsion system 20, e.g., more than seventy-five percent (75%) of thrust. The aircraft propulsion system 20 of the present disclosure, however, is not limited to the foregoing exemplary thrust ratio.

To condition (e.g., de-swirl, etc.) the bypass air propelled aft by the open propulsor rotor 40, the aircraft propulsion system 20 of FIG. 1 includes one or more open (e.g., unducted) guide vanes 64 forming an open (e.g., unducted) guide vane array 66. This open guide vane array 66 is arranged with and downstream of the open propulsor rotor 40 at the exterior of the aircraft propulsion system 20. The open guide vane array 66 extends circumferentially about (e.g., completely around) the engine housing 34 and the axial centerline 22. Each of the open guide vanes 64 is connected to the engine housing 34. Each of the open guide vanes 64 includes an airfoil 68 that projects radially out from the engine housing 34 to a distal (e.g., unsupported, unducted, etc.) tip 70 of the airfoil 68. One or more or all of the open guide vanes 64 may be configured as variable guide vanes. Each of the open guide vanes 64, for example, may be configured to pivot about a respective (e.g., radial) pivot axis 72. One or more of the open guide vanes 64 may also or alternatively be configured as fixed guide vanes.

Figure 2:
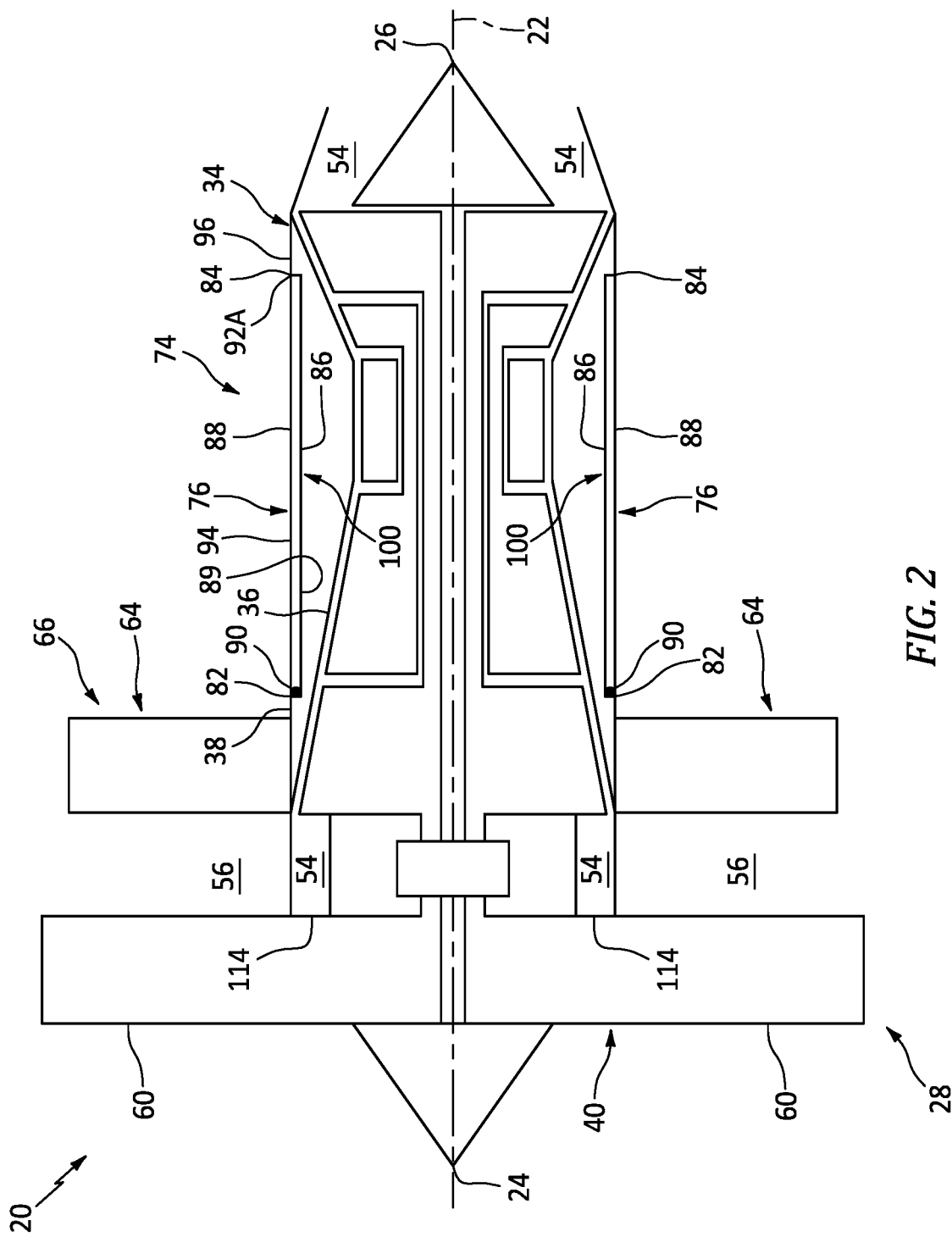
FIG. 2 is a side schematic illustration of the aircraft propulsion system with a thrust diversion system in a stow arrangement.
Figure 3:
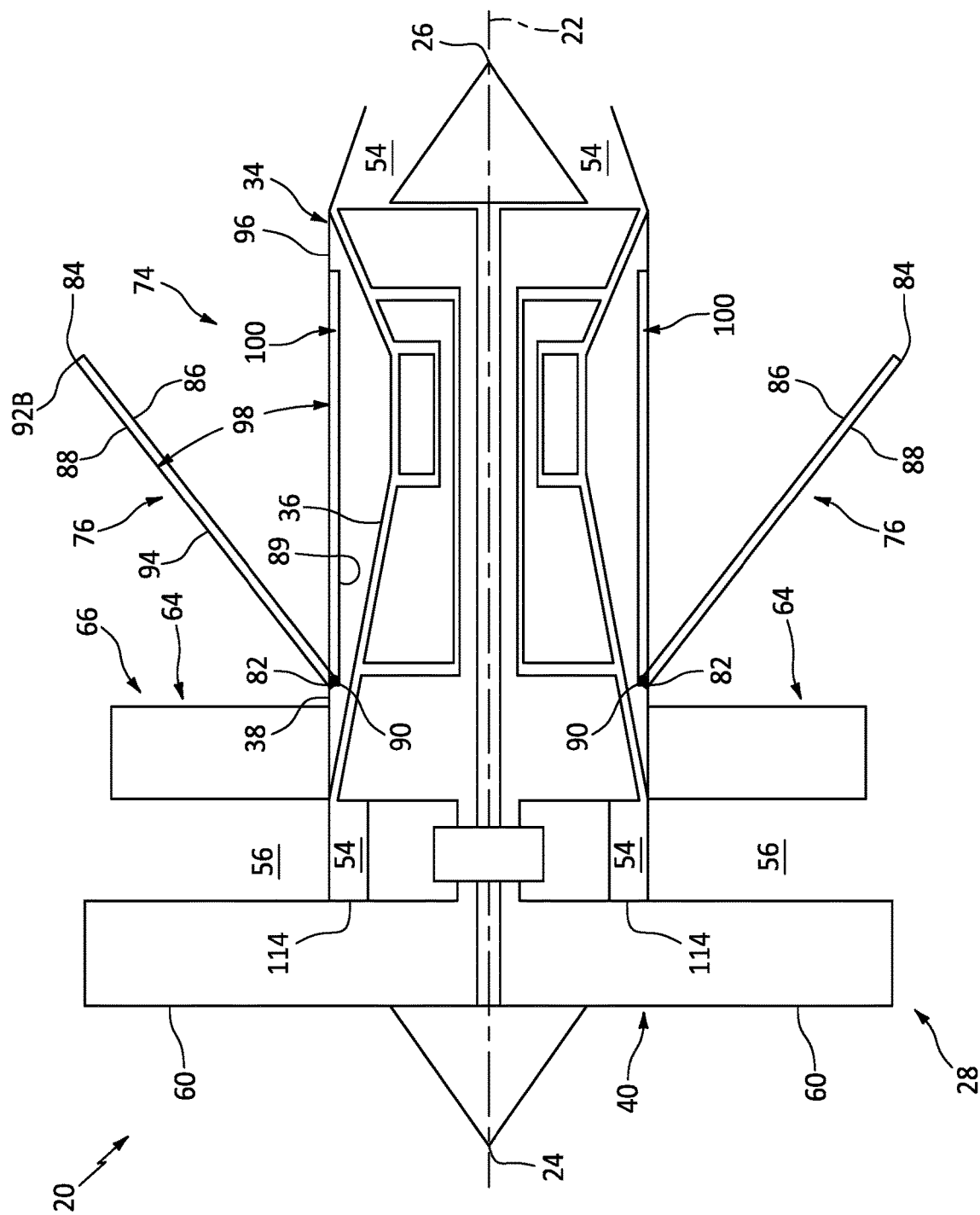
FIG. 3 is a side schematic illustration of the aircraft propulsion system with the thrust diversion system in a deployed arrangement.

Referring to FIGS. 2 and 3, the aircraft propulsion system 20 also includes a thrust diversion system 74 for diverting/redirecting a gas flow (e.g., the bypass gas) at least radially outward from the aircraft propulsion system 20 and its engine housing 34. The thrust diversion system 74 of FIGS. 2 and 3, for example, includes one or more exterior doors 76; e.g., flower petal doors.

Figure 4:
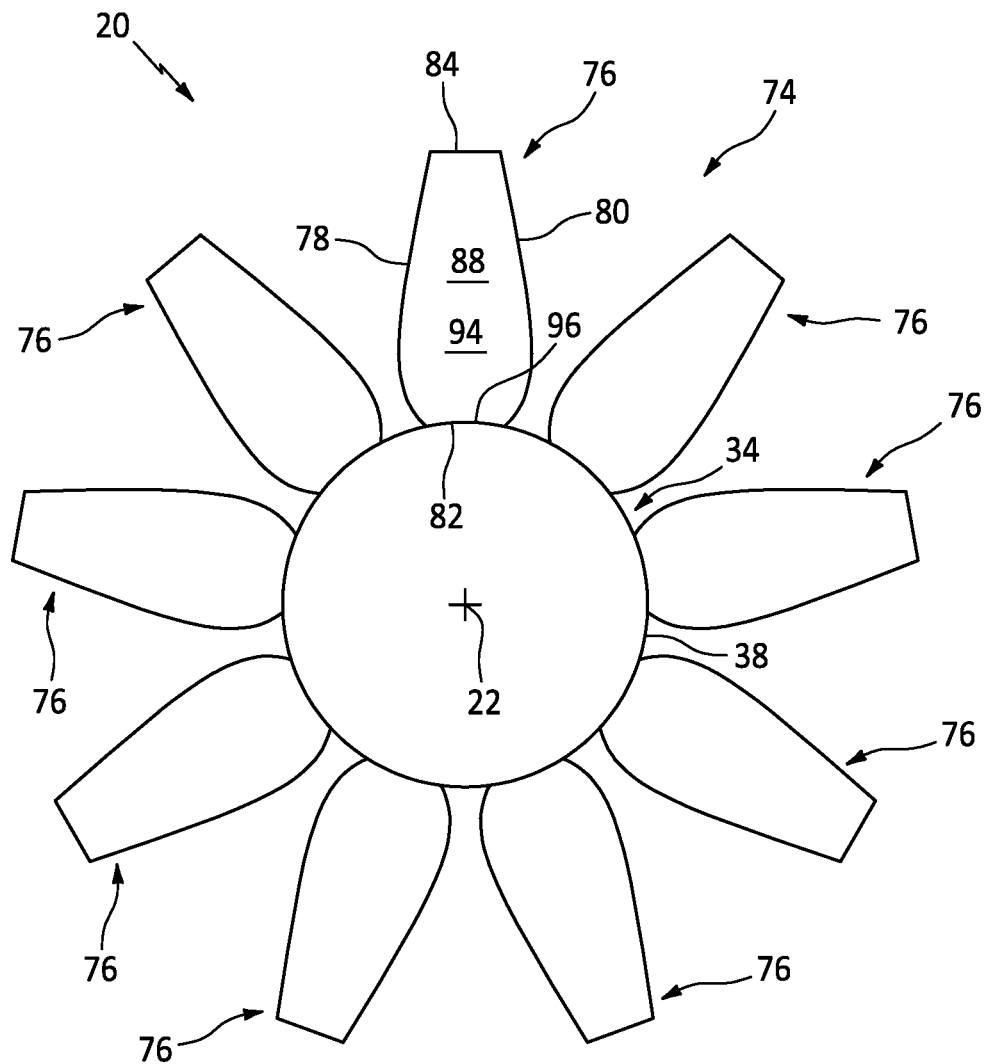
FIG. 4 is an end view illustration of a portion of the aircraft propulsion system with the thrust diversion system in the deployed arrangement.
Figure 4A:
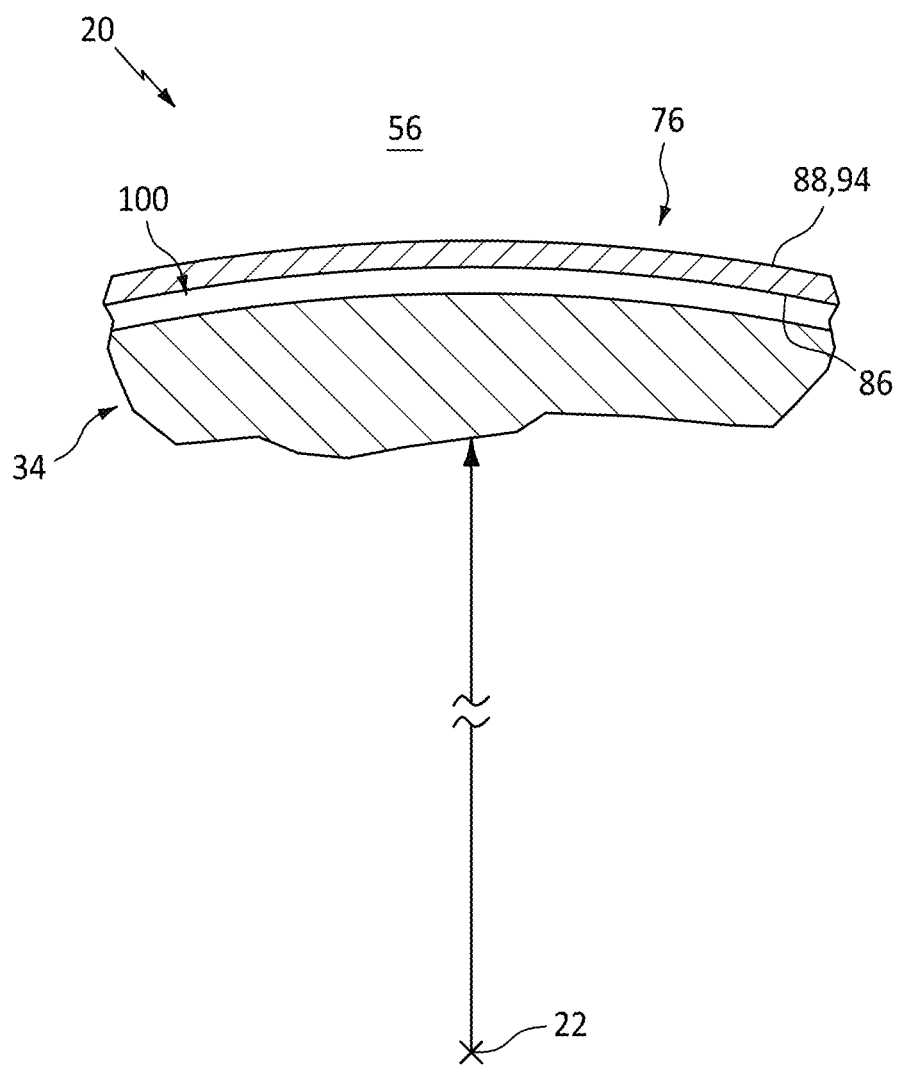
FIG. 4A is an end view illustration of a portion of the aircraft propulsions system with the thrust diversion system of FIG. 4, in the stow arrangement.

Referring to FIG. 4, the exterior doors 76 are distributed circumferentially about (e.g., completely around) the engine housing 34 in, for example, a flower petal array. Each of the exterior doors 76 extends laterally (e.g., circumferentially; see also FIG. 4A) between and to a first side 78 of the respective exterior door 76 and a second side 80 of the respective exterior door 76. Each of the exterior doors 76 may extend circumferentially between the first side 78 of the respective exterior door 76 and the second side 80 of the respective exterior door 76, and at least one of the first side 78 of the respective exterior door 76 or the second side 80 of the respective exterior door 76 has a curved convex geometry at a radially inner end (e.g., the end closest to a housing exterior surface 96) of the respective exterior door 76 when in the deployed position. Referring to FIGS. 2 and 3, each of the exterior doors 76 extends longitudinally (e.g., substantially axially in FIG. 2) between and to a forward, upstream end 82 of the respective exterior door 76 and an aft, downstream end 84 of the respective exterior door 76. Each of the exterior doors 76 extends vertically (e.g., radially in FIG. 2) between and to an interior (e.g., radial inner) side 86 of the respective exterior door 76 and an exterior (e.g., radial outer) side 88 of the respective exterior door 76.

Each of the exterior doors 76 is movably attached to a support structure 89 of the engine housing 34. Each of the exterior doors 76, for example, may be pivotally attached to the support structure 89 by a pivot attachment 90 (e.g., a hinge, etc.) at the door upstream end 82. Each of the exterior doors 76 may thereby move (e.g., pivot) radially outward from a stowed position of FIG. 2 to a deployed position of FIG. 3 (see also FIG. 4) when the thrust diversion system 74 is deployed. More particularly, each door downstream end 84 may move radially outward from a first location 92A when the respective exterior door 76 is stowed (see FIG. 2) to a second location 92B when the respective exterior door 76 is deployed (see FIG. 3). A radius from the axial centerline 22 to the first location 92A of FIG. 2 is less than a radius from the axial centerline 22 to the second location 92B of FIG. 3. The second location radius of FIG. 3 is also greater than a radius from the axial centerline 22 to the respective door upstream end 82 when the respective exterior door 76 is deployed. Each exterior door 76 may thereby angularly cant when deployed such that an exterior surface 94 of the respective exterior door 76 at its door exterior side 88 is angularly offset from an exterior surface 96 of an (e.g., axially and/or circumferentially) adjacent portion of the engine housing 34 by an included angle 98 (e.g., an acute angle) when the respective exterior door 76 is deployed. By contrast, when the respective exterior door 76 is stowed, the door exterior surface 94 may be exactly or substantially (e.g., within +/−2°) parallel with (e.g., flush with) the housing exterior surface 96. For example, each of the exterior doors 76 may lay against the support structure 89 and/or may be seated in a recess 100 in the engine housing 34 when the respective exterior door 76 is in its stowed position such that each of the exterior doors 76 extends along the engine housing 34 from the respective upstream end 82 radially outboard of the compressor section 29 to the respective downstream end 84 radially outboard of the turbine section 31. With this arrangement, the door exterior surfaces 94 and the housing exterior surface 96 may collectively form the inner peripheral boundary of the bypass flowpath 56 downstream of the open propulsor rotor 40 and the open guide vane array 66 when the thrust diversion system 74 is stowed.

Figure 5A:
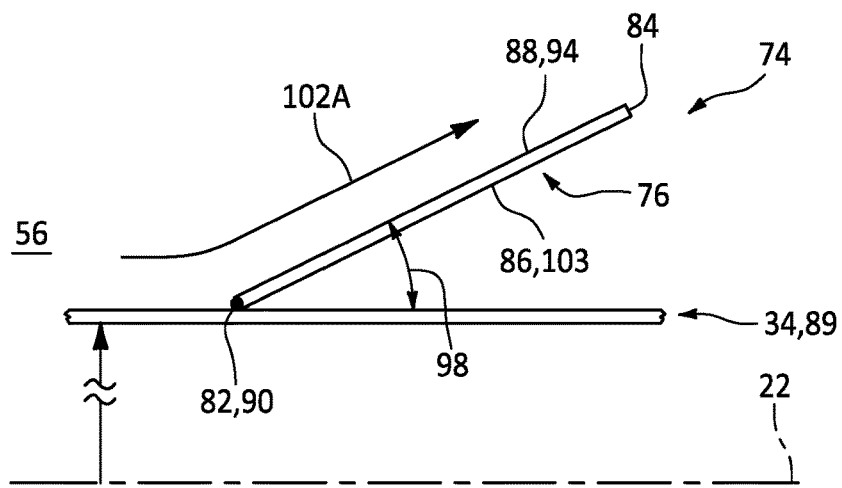
FIGS. 5A-5C are side schematic illustrations of various exterior door arrangements for the thrust diversion system at various deployed positions.

In some embodiments, referring to FIG. 5A, the thrust diversion system 74 may be configured to redirect the gas flow (e.g., the bypass gas) to reduce forward propulsion system thrust. One or more or all of the exterior doors 76, for example, may each be deployed to an aft, downstream canted position such that the door exterior surface 94 redirects the gas flow outward along a trajectory 102A with a radial outward component and an axial aft component.

Figure 5B:
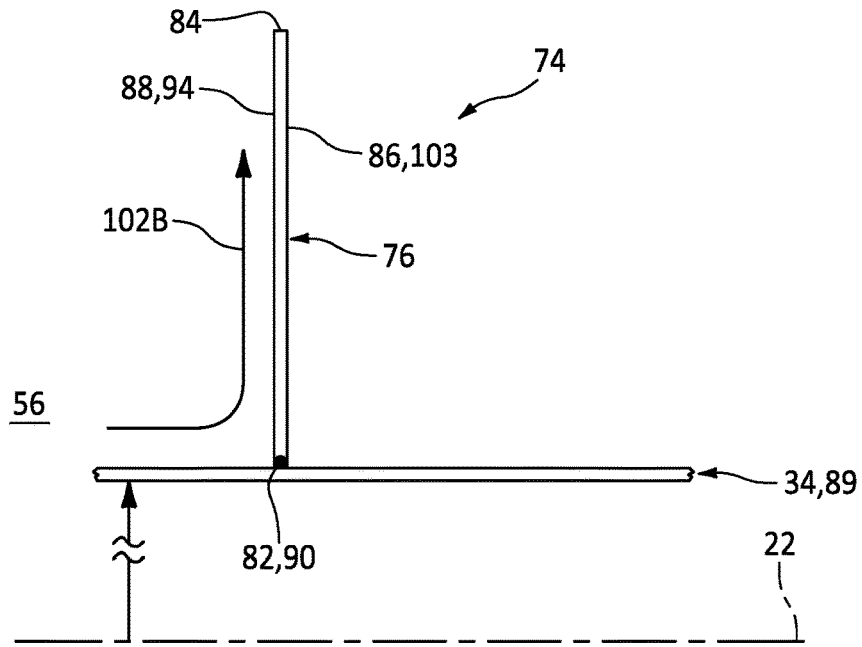

In some embodiments, referring to FIG. 5B, the thrust diversion system 74 may be configured to redirect the gas flow (e.g., the bypass gas) to substantially stop forward propulsion system thrust. One or more or all of the exterior doors 76, for example, may each be deployed to a radial position where, for example, the door exterior surface 94 is substantially perpendicular to the axial centerline 22. The door exterior surface 94 may thereby be operable to redirect the gas flow outward along a trajectory 102B with substantially (e.g., +/−) 2° or only a radial outward component.

Figure 5C:
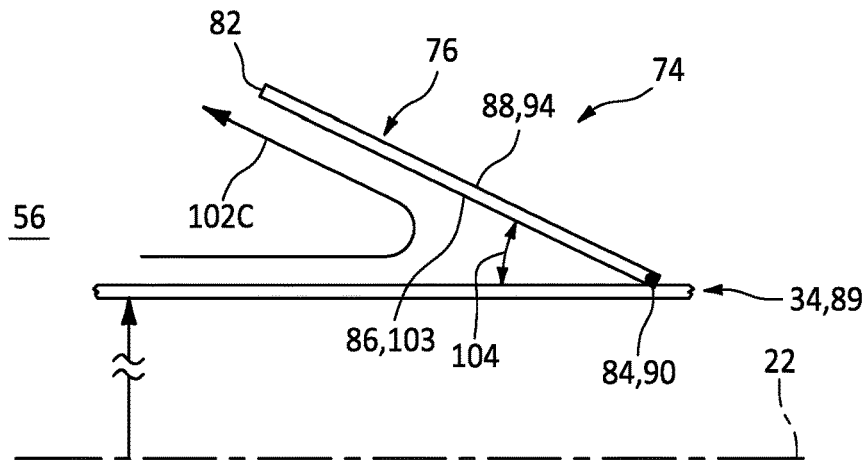

In some embodiments, referring to FIG. 5C, the thrust diversion system 74 may be configured to redirect the gas flow (e.g., the bypass gas) to provide reverse propulsion system thrust; e.g., the thrust diversion system 74 may be configured as a thrust reverser system. One or more or all of the exterior doors 76, for example, may each be deployed to a forward, upstream canted position such that a door interior surface 103 redirects the gas flow outward along a trajectory 102C with a radial outward component and an axial forward component. For example, each of the exterior doors 76 of FIG. 5C may be pivotally attached to the support structure 89 by the pivot attachment 90 (e.g., a hinge, etc.) at the door downstream end 84. Each door upstream end 82 may thereby move radially outward from a first location (e.g., see arrangement of FIG. 2) when the respective exterior door 76 is stowed to a second location when the respective exterior door 76 is deployed (see FIG. 5C). A radius from the axial centerline 22 to the first location is less than a radius from the axial centerline 22 to the second location. The second location radius is also greater than a radius from the axial centerline 22 to the respective door upstream end 82 when the respective exterior door 76 is deployed. Each exterior door 76 may thereby angularly cant when deployed such that the door interior surface 103 is angularly offset from housing exterior surface 96 by an included angle 104 (e.g., an acute angle) when the respective exterior door 76 is deployed.

Figure 6:
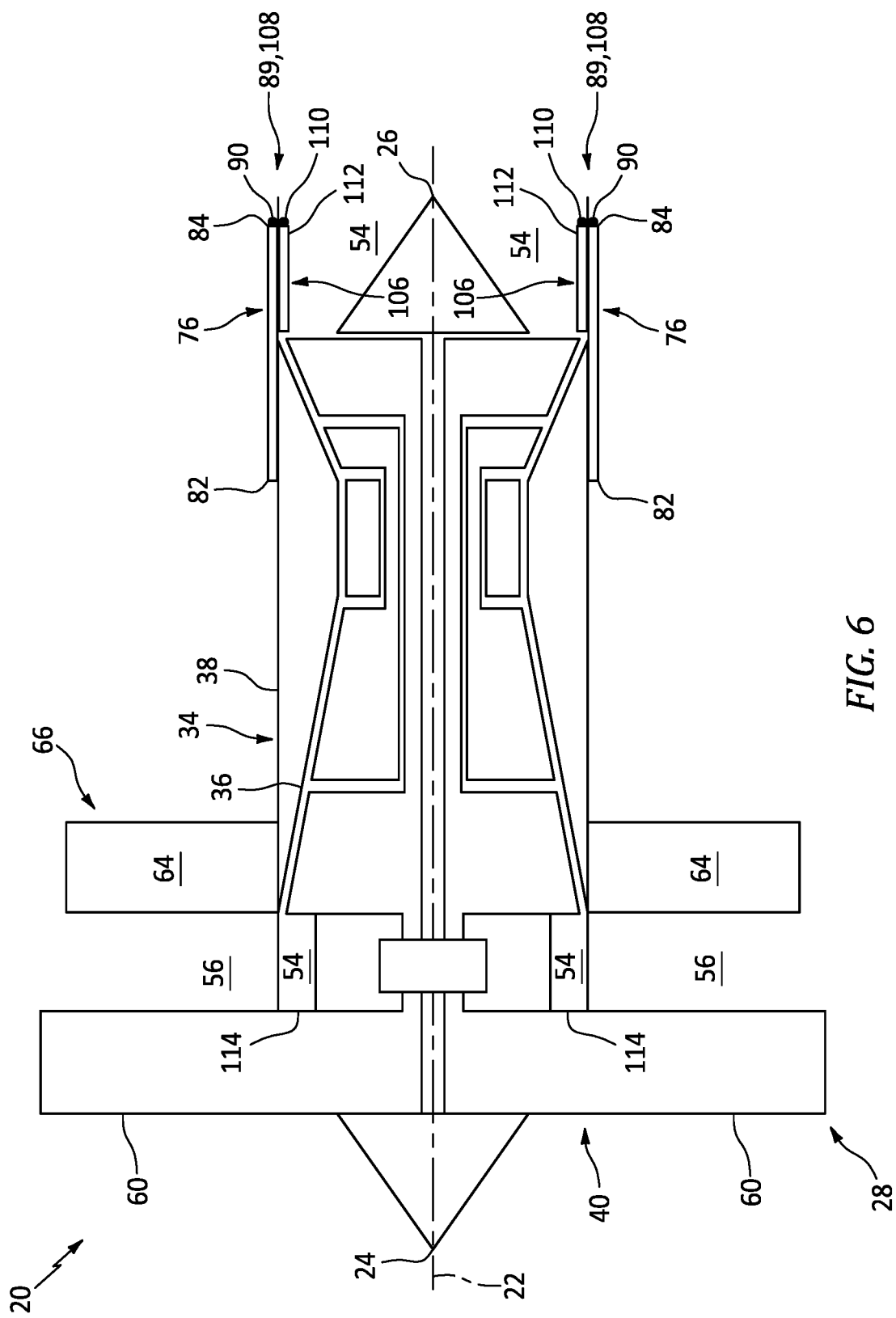
FIG. 6 is a side schematic illustration of the aircraft propulsion system configured with the exterior doors and interior doors in a stow arrangement.
Figure 7:
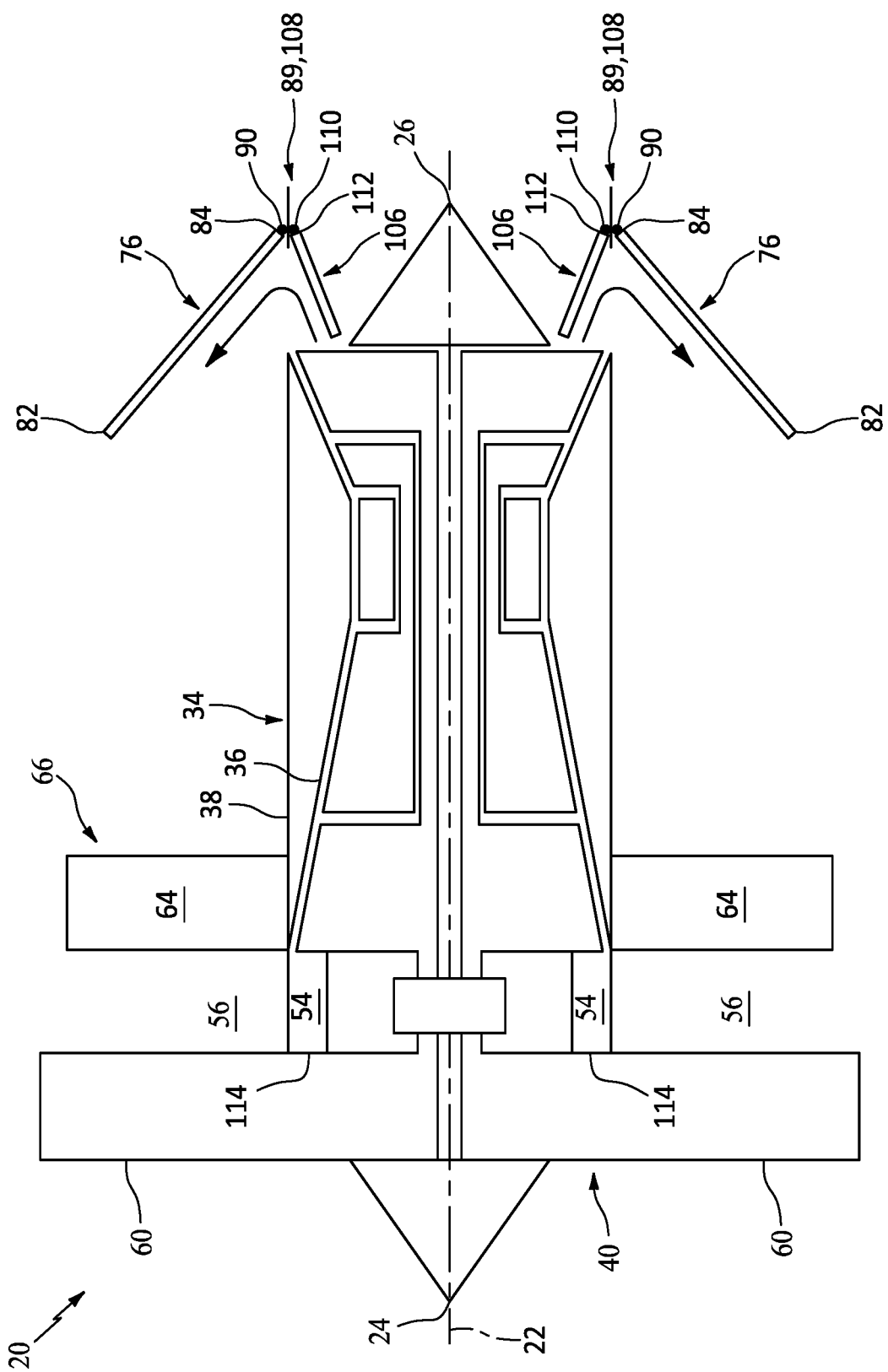
FIG. 7 is a side schematic illustration of the aircraft propulsion system configured with the exterior doors and the interior doors in a deployed arrangement.

In some embodiments, referring to FIGS. 5A-5C, the thrust diversion system 74 may be configured to redirect a gas flow exterior to the aircraft propulsion system 20 and its engine housing 34; e.g., the bypass gas. In other embodiments, referring to FIGS. 6 and 7, the thrust diversion system 74 may also or alternatively be configured to redirect a gas flow within (e.g., interior to) the aircraft propulsion system 20 and its engine housing 34; e.g., the core gas. The thrust diversion system 74, for example, may also or alternatively include one or more interior doors 106.

The interior doors 106 are distributed circumferentially about (e.g., completely around) the axial centerline 22 in an array. Each of the interior doors 106 is movably attached to a support structure 108 of the engine housing 34. Each of the interior doors 106, for example, may be pivotally attached to the support structure 108 by a pivot attachment 110 (e.g., a hinge, etc.) at an (e.g., downstream) end 112 of the respective interior door 106. Each of the interior doors 106 may thereby pivot radially inward into a flowpath (e.g., the core flowpath 54) from a stowed position of FIG. 6 to a deployed position of FIG. 7. In the stowed position of FIG. 6, the interior doors 106 may be to a side of the flowpath such that flow through the flowpath along the interior doors 106 is substantially unobstructed. In the deployed position of FIG. 7, the interior doors 106 may project radially into the flowpath such that flow within the flowpath is redirected radially outward by the interior doors 106. This outward flow may then be further guided (e.g., turned) by the exterior doors 76. Alternatively, it is contemplated the exterior doors 76 may be omitted.

The thrust diversion systems 74 described above are configured to divert/redirect the gas flow radially outward and, thus, away from an inlet 114 (e.g., see FIGS. 3 and 7) to the engine core; e.g., the inlet to the core flowpath 54. The thrust diversion systems 74 may therefore operate without, for example, affecting (e.g., reducing) air intake into the engine core.

In some embodiments, the open guide vane array 66 and its open guide vanes 64 may be omitted from the aircraft propulsion system 20.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A propulsion system for an aircraft, comprising:
an engine housing;
an open propulsor rotor outside of the engine housing;
an engine core within the engine housing and motively coupled to the open propulsor rotor;
a thrust diversion system configured with the engine housing, the thrust diversion system comprising a door configured to move radially from a stowed position to a deployed position, and the door seated in a recess of the engine housing when the door is in the stowed position, the door extending circumferentially between a first side of the door and a second side of the door, and at least one of the first side of the door or the second side of the door has a curved convex geometry at a radially inner end of the door when the door is in the deployed position; and
an open guide vane array arranged with the open propulsor rotor upstream of the thrust diversion system, the open guide vane array comprising a plurality of guide vanes arranged circumferentially about the engine housing.

2. The propulsion system of claim 1, wherein
the door is disposed at an exterior of the engine housing; and
the door is configured to move radially outward from the stowed position to the deployed position.

3. The propulsion system of claim 1, wherein the door is configured to pivot radially outward from the stowed position to the deployed position.

4. The propulsion system of claim 1, wherein the door lays against a structure of the engine housing when the door is in the stowed position.

5. The propulsion system of claim 1, wherein an exterior surface of the door is angularly offset from an exterior surface of the engine housing by an angle when the door is in the deployed position.

6. The propulsion system of claim 5, wherein the exterior surface of the door is parallel with the exterior surface of the engine housing when the door is in the stowed position.

7. The propulsion system of claim 1, wherein a downstream end of the door moves radially outward when the door moves from the stowed position to the deployed position.

8. The propulsion system of claim 1, wherein a downstream end of the door is radially outboard of an upstream end of the door when the door is in the deployed position.

9. The propulsion system of claim 1, wherein an upstream end of the door moves radially outward when the door moves from the stowed position to the deployed position.

10. The propulsion system of claim 1, wherein an upstream end of the door is radially outboard of a downstream end of the door when the door is in the deployed position.

11. The propulsion system of claim 1, wherein the door is one of a plurality of doors arranged in an array at an exterior of the engine housing, the array extending circumferentially about a centerline of the propulsion system.

12. The propulsion system of claim 1, wherein the thrust diversion system is configured to divert air, propelled by the open propulsor rotor outside of the engine housing, radially outwards away from a centerline of the propulsion system when the door is in the deployed position.

13. A propulsion system for an aircraft, comprising:
an engine housing;
an engine core within the engine housing and extending along an axial centerline, and the engine core including a compressor section, a combustor section aft of the compressor section, and a turbine section aft of the combustor section;
an unducted rotor outside of the engine housing;
a thrust diversion system configured with the engine housing downstream of the unducted rotor, the thrust diversion system comprising a door configured to pivot radially about an upstream end outward from a stowed position to a deployed position, and the thrust diversion system configured to redirect a gas flow radially outward from the propulsion system when the door is pivoted radially outward to the deployed position, and in the stowed position the door extends along the engine housing from the upstream end radially outboard of the compressor section to a downstream end radially outboard of the turbine section; and
an unducted guide vane arranged with the unducted rotor upstream of the thrust diversion system, the unducted guide vane projecting radially outward from the engine housing to a tip.

14. A propulsion system for an aircraft, comprising:
an engine housing;
an open propulsor rotor outside of the engine housing;
an engine core within the engine housing and motively coupled to the open propulsor rotor, the engine core comprising an upstream portion and a downstream portion, the upstream portion including a compressor section, and the downstream portion including a turbine section; and
a plurality of exterior doors arranged in an array at an exterior of the engine housing, the array extending circumferentially about a centerline of the propulsion system, and each of the plurality of exterior doors configured to move radially from a stowed position to a deployed position to divert air, propelled by the open propulsor rotor outside of the engine housing, radially outwards away from the centerline of the propulsion system;
wherein a downstream end of each of the plurality of exterior doors moves radially outward when moving from the stowed position to the deployed position; and
wherein, in the stowed position, each of the plurality of exterior doors extends along the engine housing from an upstream end that is radially outboard of the compressor section to the downstream end that is radially outboard of the turbine section.

\* \* \* \* \*